US008224496B2

(12) United States Patent
Musti et al.

(10) Patent No.: US 8,224,496 B2
(45) Date of Patent: Jul. 17, 2012

(54) MODULAR POWER CONTROL SYSTEM TO MANAGE POWER CONSUMPTION

(75) Inventors: Subrahmanyam S. Musti, Tampa, FL (US); Sri Ramanathan, Lutz, FL (US); Matthew A. Terry, Dunwoody, GA (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 12/389,554

(22) Filed: Feb. 20, 2009

(65) Prior Publication Data

US 2010/0218010 A1 Aug. 26, 2010

(51) Int. Cl.
G06F 19/00 (2011.01)
(52) U.S. Cl. ............................ 700/295; 700/22; 700/297
(58) Field of Classification Search .................... 700/22, 700/295, 297; 340/10.33
See application file for complete search history.

(56) References Cited

U.S. PATENT DOCUMENTS

| 6,476,708 | B1 | 11/2002 | Johnson |
| 6,816,063 | B2 | 11/2004 | Kubler et al. |
| 6,909,891 | B2 | 6/2005 | Yamashita et al. |
| 6,982,656 | B1* | 1/2006 | Coppinger et al. ........... 340/988 |
| 7,102,493 | B1* | 9/2006 | Coppinger et al. ...... 340/426.19 |
| 7,136,709 | B2* | 11/2006 | Arling et al. ..................... 700/65 |
| 7,319,412 | B1* | 1/2008 | Coppinger et al. ........... 340/988 |
| 7,668,532 | B2 | 2/2010 | Shamoon et al. |
| 7,715,951 | B2* | 5/2010 | Forbes et al. ................. 700/291 |
| 2002/0072356 | A1 | 6/2002 | Yamashita et al. |
| 2004/0051393 | A1 | 3/2004 | Ratcliffe |
| 2005/0049760 | A1 | 3/2005 | Narayanaswami et al. |
| 2006/0111089 | A1* | 5/2006 | Winter et al. ............... 455/414.1 |
| 2006/0111955 | A1* | 5/2006 | Winter et al. ....................... 705/8 |
| 2006/0232437 | A1 | 10/2006 | Gutowski et al. |
| 2007/0032225 | A1* | 2/2007 | Konicek et al. ............... 455/417 |
| 2007/0115902 | A1 | 5/2007 | Shamoon et al. |
| 2008/0012722 | A1 | 1/2008 | Moseley |
| 2009/0248854 | A1* | 10/2009 | Conway ........................ 709/224 |

FOREIGN PATENT DOCUMENTS

| KR | 2009 0016906 A1 | 2/2009 |
| WO | 01/46926 A1 | 6/2001 |
| WO | 2004/034352 A1 | 4/2004 |
| WO | 2007/054584 A1 | 5/2007 |

OTHER PUBLICATIONS

Communication Relating to the Results of the Partial international Search, PCT/EP2010/051999, dated Aug. 26, 2010.
Office Action dated Jun. 7, 2011 in U.S. Appl. No. 12/389,543.
Final Office Action dated Sep. 23, 2011 in U.S. Appl. No. 12/389,543.

* cited by examiner

Primary Examiner — Michael D Masinick
(74) Attorney, Agent, or Firm — Anna L. Linne; Roberts Mlotkowski Safram & Cole, P.C.

(57) ABSTRACT

A method implemented in a computer infrastructure having computer executable code having programming instructions tangibly embodied on a computer readable storage medium. The programming instructions are operable to receive an indication of a geoboundary event and determine an occurrence of at least one of a radio frequency identification (RFID) event and a local area network (LAN) event. Additionally, the programming instructions are operable to adjust one or more power consumption settings of an environment based on at least one of the receiving of the indication of the geoboundary event and the determination of the occurrence of the at least one of the RFID event and the LAN event.

26 Claims, 5 Drawing Sheets

MODULAR POWER CONTROL SYSTEM TO MANAGE POWER CONSUMPTION

CROSS REFERENCE TO RELATED APPLICATION

This application is related to U.S. Ser. No. 12/389,543 filed on the same day, the contents of which are incorporated by reference herein in their entirety.

FIELD OF THE INVENTION

The present invention generally relates to managing power consumption, and more particularly, to a modular power control unit to manage power consumption using radio frequency identification (RFID) sensors, network location geoboundaries and internet protocol (IP) multimedia subsystem based presence documents.

BACKGROUND

Energy conservation is the practice of decreasing the quantity of energy used. Energy conservation may be achieved through efficient energy use, in which case energy use is decreased while achieving a similar outcome and/or by reduced consumption of energy services. Energy conservation may result in, for example, increase of financial capital, environmental value, national security, personal security, and human comfort. Individuals and organizations that are direct consumers of energy may want to conserve energy in order to reduce energy costs and promote economic security. Industrial and commercial users may want to increase efficiency and thus maximize profit.

Energy conservation is an important element of energy policy. Energy conservation reduces the energy consumption and energy demand per capita, and thus offsets the growth in energy supply needed to keep up with population growth. This reduces the rise in energy costs, and can reduce the need for new power plants and energy imports. The reduced energy demand can provide more flexibility in choosing the most preferred methods of energy production.

Additionally, by reducing emissions, energy conservation is an important part of lessening climate change. Energy conservation facilitates the replacement of non-renewable resources with renewable energy. Energy conservation is often the most economical solution to energy shortages, and is a more environmentally benign alternative to increased energy production.

In view of the above, people are looking for ways to reduce power consumption towards saving energy and reducing carbon footprints globally. For example, architects and civil engineers are looking for ways to design new energy efficient homes and offices, and individuals are looking for ways and mechanisms to reduce their personal power consumption.

However, there still exist many instances of wasted power consumption. For example, most device chargers (such as, for example, a cellular phone charger) continue to draw power when they are not charging a device. That is, even when a device is not connected to its charger, if the charger is plugged into a power outlet, the charger will continue to draw (and waste) power. Collectively, this wasted power costs billions of dollars globally. Moreover, with the increasing awareness and desire to operate in a green manner, such excessive use of energy is undesirable.

Accordingly, there exists a need in the art to overcome the deficiencies and limitations described hereinabove.

SUMMARY

In a first aspect of the invention, a method is implemented in a computer infrastructure having computer executable code tangibly embodied on a computer readable storage medium having programming instructions. The programming instructions are operable to receive an indication of a geoboundary event and determine an occurrence of at least one of a radio frequency identification (RFID) event and a local area network (LAN) event. Additionally, the programming instructions are operable to adjust one or more power consumption settings of an environment based on at least one of the receiving of the indication of the geoboundary event and the determination of the occurrence of the at least one of the RFID event and the LAN event.

In another aspect of the invention, a system comprises a modular power control unit (MPCU) operable to receive an indication of a geoboundary event and determine an occurrence of at least one of a radio frequency identification (RFID) event and a local area network (LAN) event. Additionally, the MPCU is operable to adjust one or more power consumption settings of an environment based on at least one of the receiving the indication of the geoboundary event and the determining the occurrence of that at least one of the RFID event and the LAN event.

In an additional aspect of the invention, a computer program product comprising a computer usable storage medium having readable program code embodied in the medium is provided. The computer program product includes at least one component operable to receive an indication of a geoboundary event and determine an occurrence of at least one of a radio frequency identification (RFID) event and a local area network (LAN) event. Additionally, the at least one component is operable to adjust one or more power consumption settings of an environment based on at least one of the receiving of the indication of the geoboundary event and the determination of the occurrence of the at least one of the RFID event and the LAN event. Furthermore, the computer program product is registered as a session initiation protocol (SIP) client user agent, and the indication of the geoboundary event is received via SIP.

In a further aspect of the invention, a method comprises providing a computer infrastructure operable to receive an indication of a geoboundary event via session initiation protocol (SIP), wherein the receiving the indication of the geoboundary event occurs in response to a determination that a wireless device in a wireless carrier network has traversed an established geoboundary. Additionally, the computer infrastructure is operable to detect an occurrence of at least one of a radio frequency identification (RFID) event and a local area network (LAN) event and receive one or more power consumption rules for at least one power consuming device. Furthermore, the computer infrastructure is operable to adjust one or more power consumption settings of an environment based on at least one of the indication of the geoboundary event and the detection of the occurrence of the at least one of the RFID event and the LAN event. The adjusting the one or more power consumption settings of the environment is performed in accordance with the one or more power consumption rules for the at least one power consuming device. Moreover, the adjusting the one or more power consumption settings of the environment comprises controlling power distribution in the environment by at least one of accessing an environment power grid to adjust power supply in the environment, accessing the environment power grid to effect power line wiring signaling and/or control and accessing an environment internet protocol (IP) network to effect Power-over-Ethernet signaling and/or control.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
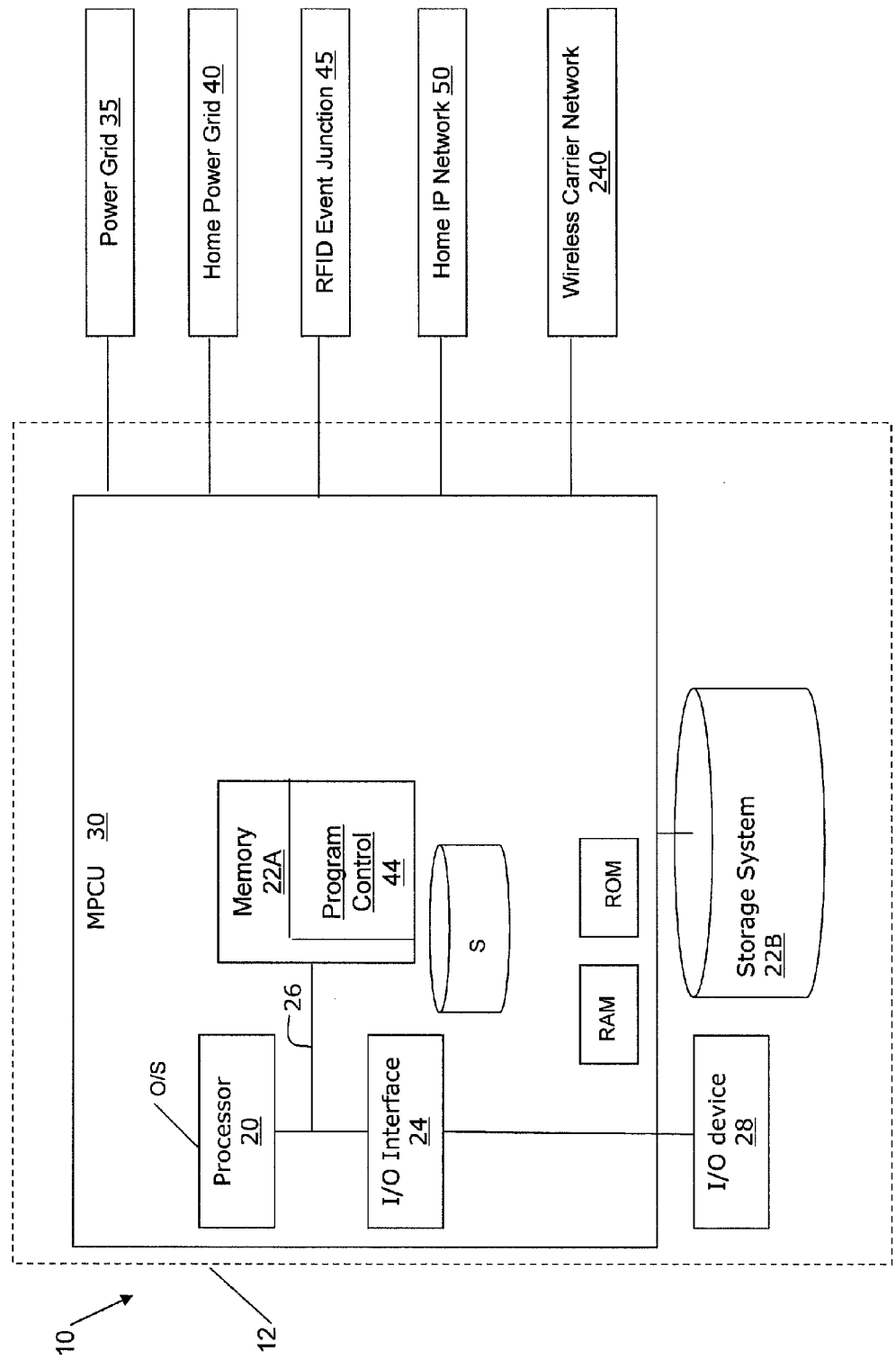
FIG. 1 shows an illustrative environment for implementing the steps in accordance with aspects of the invention.

The present invention generally relates to managing power consumption, and more particularly, to a modular power control unit (MPCU) to manage power consumption using radio frequency identification (RFID) sensors, network location geoboundaries and internet protocol (IP) multimedia subsystem based presence documents. The present invention provides a system and method for automatically controlling power consumption using RFID and presence features provided by an IMS (IP (Internet Protocol) Multimedia Subsystem) network. More specifically, the present invention provides an RFID SIP gateway modular power control unit (MPCU) to receive RFID based information and combine it with knowledge of location and presence received from a wireless network to control and manage power consumption in a home and/or office environment.

Radio Frequency Identification

Radio-frequency identification (RFID) is an automatic identification method, relying on storing and remotely retrieving data using devices called RFID sensors, tags or transponders. RFID technology utilizes some extent of cooperation between an RFID reader and an RFID tag. An RFID tag is an object that can be, for example, applied to or incorporated into, e.g., a product, animal, or person for the purpose of identification and tracking using radio waves. Some RFID tags, for example, may be read from several meters away and beyond the line of sight of the reader. Most RFID tags contain at least two components. One component is an integrated circuit for storing and processing information, modulating and demodulating a radio-frequency (RF) signal, and other specialized functions. The second component is an antenna for receiving and transmitting the signal.

RFID tags are being placed globally in a variety of consumer devices, including, for example, clothing, electronic devices, and electrical appliances, etc. While most of these tags are passive tags (costing just pennies per tag), there are a number of relatively higher value devices that will have active tags associated with them.

Passive RFID tags have no internal power supply. The minute electrical current induced in the antenna by the incoming radio frequency signal provides just enough power for the complementary metal-oxide semiconductor (CMOS) integrated circuit in the RFID tag to power up and transmit a response. The response of a passive RFID tag is not necessarily just an ID number. For example, the RFID tag chip can contain non-volatile data, (e.g., stored on a writable EEPROM). Passive RFID tags have practical read distances ranging from about eleven cm (four inches) with near-field, up to approximately ten meters (thirty-three feet) with far-field and can reach up to one-hundred-eighty-three meters (six-hundred feet).

Unlike passive RFID tags, active RFID tags have their own internal power source, which is used to power the integrated circuits and to broadcast the response signal to the reader. Communications from active RFID tags to readers is typically much more reliable (e.g., fewer errors) than those from passive RFID tags due to the ability for active RFID tags to conduct a "session" with a reader.

Additionally, active RFID tags, due to their onboard power supply, may transmit at higher power levels than passive RFID tags, allowing them to be more robust in "RF challenged" environments with, for example, humidity and spray or with RF-dampening targets (e.g., including humans and cattle, which contain mostly water), reflective targets from metal (e.g., shipping containers, vehicles), or at longer distances. However, in contrast to passive RFID tags, active RFID tags are generally bigger (e.g., due to battery size) and more expensive to manufacture (e.g., due to price of the battery). However, the potential shelf life of active RFID tags is comparable to the shelf life of passive RFID tags, as self-discharge of batteries (of active RFID tags) competes with corrosion of aluminated printed circuits (of passive RFID tags).

Many active RFID tags today have operational ranges of hundreds of meters, and a battery life from several months to ten years. Active RFID tags may include larger memories than passive RFID tags, and may include the ability to store additional information received from the reader.

Internet Protocal Multimedia Subsystem/Session Initiation Protocal

IMS (IP (Internet Protocol) Multimedia Subsystem) is a next generation network architecture that allows wireless network carriers to both standardize and optimize Opex (Operational Expenditure) but also allows wireless network carriers to roll out next generation revenue generating services using a common IP backbone using Session Initiation Protocol (SIP) as the common signaling framework. Typical services leveraging IMS include, e.g., rich media centric services comprised of mixed media such as, for example, voice, video and other data.

SIP is a signaling protocol, widely used, for example, for setting up and tearing down multimedia communication sessions such as, e.g., voice and video calls over the Internet. Other feasible application examples include video conferencing, streaming multimedia distribution, instant messaging, presence information and online games. The protocol may be used for creating, modifying and terminating two-party (unicast) or multiparty (multicast) sessions consisting of one or several media streams. The modification can involve, for example, changing addresses or ports, inviting more participants, adding or deleting media streams, etc.

The SIP protocol may be situated at the session layer in the Open Systems Interconnection (OSI) model, and at the application layer in the transmission control protocol/internet protocol (TCP/IP) model. SIP is designed to be independent of the underlying transport layer. SIP may be run on, for example, TCP, user datagram protocol (UDP), or stream control transmission protocol (SCTP), amongst other protocols. Further, SIP is transport-independent, because SIP can be used with UDP, TCP, SCTP, etc., and is text-based, allowing for humans to read and analyze SIP messages.

SIP user agents (UAs) are the end-user devices, used to create and manage a SIP session. A SIP UA has two main components, the user agent client (UAC) and the user agent server (UAS). The UAC sends messages and answers with SIP responses. The UAS responds to SIP requests sent by the UAC.

While the present invention is described using SIP communications, the invention contemplates other communications protocols. Other communication protocols include, for example, TCP/IP, short message service (SMS), multimedia message service (MMS), or hypertext transfer protocol (HTTP), amongst other communication protocols.

As described above, the MPCU of the present invention is operable to receive RFID based information and combine it with knowledge of location and presence received from the wireless network to control and manage power consumption in a home/office environment. As should be understood by those of ordinary skill in the art, location information may be used to define where an object, e.g., a person or a cellular telephone, is located. Location may be obtained by GPS, A-GPS or triangulation methods known to those of skill in the art. Additionally, in computer and telecommunications networks, presence information is a status indicator that conveys ability and willingness of a potential communication partner, for example, a user, to communicate. A user's client may provide presence information (e.g., presence state) via a network connection to a presence service, which may be stored in what constitutes the user's personal availability record (called a presentity) and can be made available for distribution to other users (called watchers) to convey their availability for communication. Presence information has wide application in many communication services and is one of the innovations driving the popularity of instant messaging or recent implementations of voice over IP clients.

IMS allows for next generation foundational services such as presence and location to be exposed and consumed more efficiently. Specifically, mechanisms exist today to integrate location information into presence documents, which allows for location related changes to be transmitted to watchers via standard SIP (Session Initiation Protocol) based semantics.

By implementing the present invention, significant amounts of power may be saved, allowing for significant reductions in the global carbon footprint, while being plugged into the existing infrastructure both in the home and the wireless carrier network. Location geoboundaries can be used to drive master rules including control of appliances in the enclosure/environment (e.g., home and/or office), resulting in significant power savings. Furthermore, concentric geoboundaries allow the MPCU to initiate actions when subscribers, e.g., enter the outer geoboundary (for example, turn on a water heater).

Additionally, by implementing the present invention, RFID events triggered in the enclosure/environment can result in external SIP events that are sent from the MPCU to externally authorized watchers. Furthermore, implementing the present invention allows the MPCU to use a local area network (LAN), e.g., a wireless LAN, to determine when a wireless device with a profile has left the range of the LAN.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

- an electrical connection having one or more wires,
- a portable computer diskette,
- a hard disk,
- a random access memory (RAM),
- a read-only memory (ROM),
- an erasable programmable read-only memory (EPROM or Flash memory),
- an optical fiber,
- a portable compact disc read-only memory (CDROM),
- an optical storage device, and/or
- a transmission media such as those supporting the Internet or an intranet, or
- a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server or other computing system 12 that can perform the processes described herein. In particular, the server 12 includes a modular power control unit (MPCU) 30. The MPCU 30 can be resident on a network infrastructure or computing device of a third party service provider (any of which is generally represented in FIG. 1).

The MPCU 30 is operable to receive RFID based information and combine it with knowledge of location and presence received from a wireless carrier network or other service provider to control and manage power consumption in a home and/or office environment, e.g., the processes described herein. The MPCU 30 can be implemented using one or more program code in the program control 44 stored in memory 22A as separate or combined modules.

The MPCU 30 includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The MPCU 30 is in communication with the external I/O device/resource 28 and the storage system 22B. For example, the I/O device 28 can comprise any device that enables an individual to interact with the MPCU 30 or any device that enables the MPCU 30 to communicate with one or more other computing devices using any type of communications link. The external I/O device/resource 28 may be for example, a handheld device, PDA, handset, keyboard etc. Additionally, as shown in FIG. 1, the MPCU 30 is in communication with an external power grid 35, a home power grid 40, an RFID event junction 45, a home IP network 50 and the wireless carrier network (or other service provider) 240.

In general, the processor 20 executes computer program code (e.g., program control 44), which can be stored in the memory 22A and/or storage system 22B. Moreover, in accordance with aspects of the invention, the program control 44 having program code controls the MPCU 30. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The MPCU 30 can comprise any general purpose computing article of manufacture capable of executing computer program code installed thereon (e.g., a personal computer, server, etc.). However, it is understood that the MPCU 30 is only representative of various possible equivalent-computing devices that may perform the processes described herein. To this extent, in embodiments, the functionality provided by the MPCU 30 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the processes described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

Modular Power Control Unit

In accordance with aspects of the invention, the modular power control unit (MPCU) 30 is an RFID SIP gateway, which receives RFID based information and combines the RFID based information with knowledge of location and presence received from the wireless carrier network or other service provider to control and manage power consumption in, e.g., a home and/or office environment. In embodiments, the MPCU 30 may manage power consumption via: communications with a home/office power grid (e.g., a circuit breaker box); Power over Ethernet communications; and/or communications over a power line (e.g., X10 communications), amongst other communications.

Power over Ethernet (PoE) technology describes a system to transfer electrical power, along with data, to remote devices over standard twisted-pair cable in an Ethernet network. PoE may be useful for powering, for example, IP telephones, wireless LAN access points, network cameras, remote network switches, embedded computers, and other appliances. PoE is somewhat comparable to POTS (plain old telephone service) telephones, which also receive power and data (although analog) through the same cable.

As should be understood by those of ordinary skill in the art, there are several general terms used to describe PoE. For example, the terms Power over Ethernet (PoE), Power over LAN (PoL), and Inline Power are synonymous terms used to describe the powering of attached devices via Ethernet ports.

X10 is an international and open industry standard for communication among electronic devices used for home automation. X10 uses power line wiring for signaling and control, where the signals involve brief radio frequency bursts representing digital information. A wireless radio based protocol transport is also defined. More specifically, household electrical wiring, e.g., the same which powers lights and appliances, is used to send digital data between X10 devices. This digital data is encoded onto a 120 kHz carrier which is transmitted as bursts during the relatively quiet zero crossings of the 50 or 60 Hz AC alternating current waveform. One bit is transmitted at each zero crossing.

In embodiments, the digital data consists of an address and a command sent from a controller, e.g., the MPCU 30 to a controlled device, e.g., a particular power outlet. More advanced controllers can also query equally advanced devices to respond with their status. This status may be as simple as "off" or "on", or the current dimming level, or even the temperature or other sensor reading. Devices may plug into the wall where a lamp, television, or other household appliance plugs in; however, in embodiments, some built-in controllers may be used for, e.g., wall switches and ceiling fixtures.

Whether using power line or radio communications, packets transmitted using the X10 control protocol comprise a four bit house code followed by one or more four bit unit code, finally followed by a four bit command. For example, each controlled device is configured to respond to one of the two-hundred-fifty six possible addresses (sixteen house codes×sixteen unit codes). Each device reacts to commands specifically addressed to it, or possibly to several broadcast commands. For example, the protocol may transmit a message that says "select code A3" followed by "turn on", which commands unit "A3" to turn on its device. Several units can be addressed before giving the command, allowing a command to affect several units simultaneously. For example, "select A3", "select A15", "select A4", and finally, "turn on", causes units A3, A4, and A15 to all turn on.

Additionally, as should be understood by those skilled in the art, there is no restriction that prevents using more than one house code within a single house or office. The "all lights on" command and "all units off" commands will only affect a single house code, so an installation using multiple house codes effectively has the devices divided into separate zones.

In embodiments, the MPCU 30 has an integration point to an electrical subsystem in, e.g., a home, office, warehouse and/or retail space which distributes power to all of the outlets and appliances in the home/office/warehouse/retail building. In embodiments, the integration point to an electrical subsystem may also provide for X10 communications, e.g., to X10-enabled devices. Additionally, the MPCU 30 has an integration point to a wireless wide area network (WAN) of a wireless carrier network. In embodiments, the integration point to the WAN provides for receiving presence and location information, e.g., using SIP communications from presence and location services, with specific usage of a mechanism by which location information is made part of the presence document for which the MPCU 30 is a presence watcher. In embodiments, the integration point to the wireless WAN may use an underlying transmission control protocol/internet protocol (TCP/IP) stack onboard the device, making the device a client of an existing dynamic host configuration protocol (DHCP) server inside the home and connected to the wireless carrier network using this connection as a SIP client. The MPCU 30 also has an integration point to a home IP network. In embodiments, the integration point to the home IP network provides for notifications of wireless LAN events. Additionally, in embodiments, the integration point to a home IP network provides for PoE communications.

As described in further detail below, the MPCU 30, as a SIP end point, is registered as a user agent (UA) with the IMS network, via the existing IMS control plane and serving call session control function (S-CSCF). As should be understood by those of ordinary skill in the art, any initial filter criteria (IFC) that may be required, may be performed via an existing home subscriber server (HSS) in the IMS network. Additionally, as should be understood by those of ordinary skill in the art, IFC is the grouping between a Trigger Point (the logical expression matching a message) and an Application Server. The absence of a Trigger Point in an Initial Filter Criteria indicates that the message should be forwarded to the respective Application Server.

In accordance with aspects of the invention, the MPCU 30 additionally has an integration point to an accounting platform of the carrier network, for purposes of tracking activity to drive downstream accounting and mediation processes.

Furthermore, the MPCU 30 has an integration point to a set of RFID scanners in the home/office that track movement within an established geoboundary (e.g., the home geoboundary). In accordance with aspects of the invention, this allows for granular controls, for example, at the zone level (e.g., multiple enclosures or rooms) or at the room level.

The MPCU 30 may be installed in, for example, homes, offices, warehouses and/or retail spaces, etc. and is configured so as to turn off power in multiple zones and rooms within the home, office, warehouse and/or retail space based on, for example, the following types of use case scenarios. The following types of exemplary use case scenarios assume that three people are included in a home environment, all who have activated cellular devices, such as, for example, a cellular phone. Additionally, the exemplary use case scenarios assume that these cellular devices are SIP clients subscribing to location and presence services offered by the same wireless network carrier. There are wireless carrier provisioned devices, e.g., cellular devices, in the home/office enclosure that are on most of the time, and when they are off, no location and presence services are available. In addition, with this example, these cellular devices have, e.g., passive RFID tags attached to them.

Devices and other power consumers (such as, for example, a static light-bulb) may be registered with the MPCU 30 as being in specific zones of the home. Additionally, the registration of the devices and other power consumers with the MPCU 30 include specific rules associated with these devices/consumers/outlets. For example, a rule associated with a light bulb could, e.g., dim, turn off or turn on, when a specific event (e.g., a geoboundary event or an RFID event) occurs, as explained further below.

Subscribers associated with the home/office enclosure have RFID tags on their persons (e.g., associated with a personal item, such as, for example, a keychain or within a wallet). Additionally, the subscriber's devices and their associated chargers also have RFID tags associated with them (e.g., an active tag or a passive tag). The home/office enclosure is equipped with low power RFID scanners that feed events into the MPCU 30. In accordance with aspects of the invention, the MPCU 30 may then initiate specific power processing actions sent to the consumers in the enclosure. In embodiments, the RFID scanners may be connected via an existing CAT 5 grid (e.g., a network) in the enclosure to an RFID driver subcomponent of the MPCU 30.

Multiple approximately concentric geoboundaries (with a smaller geoboundary being, e.g., the target home/office) and/or progressively larger geoboundaries may be established with a carrier location platform. As should be understood by those of ordinary skill in the art, a geoboundary defines an area that may be entered or exited. In accordance with aspects of the invention, the geoboundaries and the carrier location platform may be used to generate notifications to the MPCU 30 upon crossing the geoboundaries bidirectionally. More specifically, the location platform is configured to provide a mechanism for generating geoboundaries and receiving location information of a user. In embodiments, the geoboundaries may be set at any distance or interval and at any location. The geoboundaries can thus be designated as any area based on coordinates that will be monitored for location enabled devices entering and exiting such boundaries. Additionally, in embodiments, the carrier location platform is capable of packaging location information of an RFID presence document via SIP (even though, in embodiments, this may not be necessary to practice the present invention).

In embodiments, the location information can be obtained from a global positioning system (GPS), A-GPS or triangulation methods implemented with a mobile device, e.g., a cellular telephone. GPS, A-GPS and triangulation methods can be implemented with a location platform provided by a service provider, for example, and implemented in a known manner such that further discussion is not required herein for a person of ordinary skill in the art to understand the invention.

In accordance with aspects of the invention, the following types of exemplary scenarios are feasible with the present invention. For example, a user has a charger plugged into a wall socket in their study at home, which is currently charging their MP3 player. Additionally, the user has registered with the MPCU 30 that the MP3 player is charged in the study. When the user unplugs the device from the charger and walks out of the study, the RFID scanner, e.g., at the periphery of the study senses the movement of the device and sends a signal to the MPCU 30. Accordingly, the MPCU 30 is aware that the outlet associated with the device charger is still drawing power (e.g., even though potentially at a much more reduced level) without charging the MP3 player. Thus, in accordance with aspects of the invention, the MPCU 30 proceeds to turn the power supply to the outlet completely off, shutting the power consumption of the MP3 charger to zero. In embodiments, an accounting record may be sent to the service provider accounting platforms.

Additionally, with a second example, a user's placement of a charger may be dynamic. That is, a user may charge their MP3 player in different rooms of a house, for example, depending on their location (e.g., not always in the study). Thus, in embodiments, both the charger and the MP3 player may include an RFID tag. With this scenario, when the RFID scanner senses that the MP3 player and the charger are not, e.g., in the same room or within a certain proximity of one another, the MPCU 30 may proceed to turn the outlet to which the charger is plugged in completely off, shutting the power consumption of the MP3 charger to zero.

With a third example, a husband, his wife and his daughter, who constitute (assuming that they carry their RFID tag enabled mobile devices with them when they exit the geoboundary) all the devices registered with the wireless carrier network for their domestic geoboundary (e.g., their home), leave their home. The wireless carrier network senses the successive geoboundary triggers (e.g., using GPS, triangulation, and/or geolocation, etc.) and sends an SIP notification to the MPCU 30. In response, the MPCU 30 proceeds to, for example, dim some light bulbs in the house, e.g., using X10, and turn off other light bulbs and completely shut off the water heater, e.g., via communications with the home power grid 40, based on the configuration settings (e.g., provided by the person). An accounting record is generated and sent to the service provider accounting platforms. For example, a user may be charged a fee for each turn-on/turn-off operation performed.

With a fourth example, the same three people in the house (e.g., husband, wife and daughter) move away from a zone (e.g., comprised of one or more rooms). The RFID scanners in the zone notify the MPCU 30, which then, for example, shuts off (or turns down) the heating, ventilation and air conditioning (HVAC) system for that zone and shuts off the lights for that zone, e.g., via X10 communications and/or communications with the home power grid 40. Additionally, accounting records, as appropriate, may be sent to the service provider accounting platforms.

With a fifth example, electrical components can be activated or turned on when a broader geoboundary is crossed. That is, for example, as a user is approaching their home and crosses one or more geoboundaries (detected by the location platform), the present invention may be used in a converse manner to the previously described example, to for example, turn on devices or appliances for, e.g., just-in-time usage. For example, a broader geoboundary trigger consisting of, e.g., a user's county may be used to send a SIP notification to the MPCU 30 upon crossing the geoboundary, which could then turn on specific appliances (such as, for example, an oven or water heater just in time) for use.

With a sixth example, an RFID triggered event may occur in the home/office (for example, a device is moved or turned off), which causes the MPCU 30 to generate a SIP notification to be sent to one of the subscribers (for example, a master subscriber, e.g., a head of household). For example, a child may be grounded by a parent and restricted to the home. However, the child may nonetheless leave the home in violation of their grounding. As the child has an RFID tag associated with them, for example, on a keychain, or in a wallet and/or on their personal devices (e.g., a cellular phone), upon leaving the range of the RFID scanners, the RFID scanners in the zone notify the MPCU 30. Additionally, upon crossing the zone geoboundary (e.g., the home), the location platform may notify the MPCU 30. Accordingly, the MPCU 30 may send a SIP notification to the master subscriber (e.g., the parent) indicating that the child (or the child's device) has crossed the home geoboundary. This may, for example, cause the subscriber (e.g., the parent) to drive home to, e.g., determine the whereabouts of their child.

Figure 2:
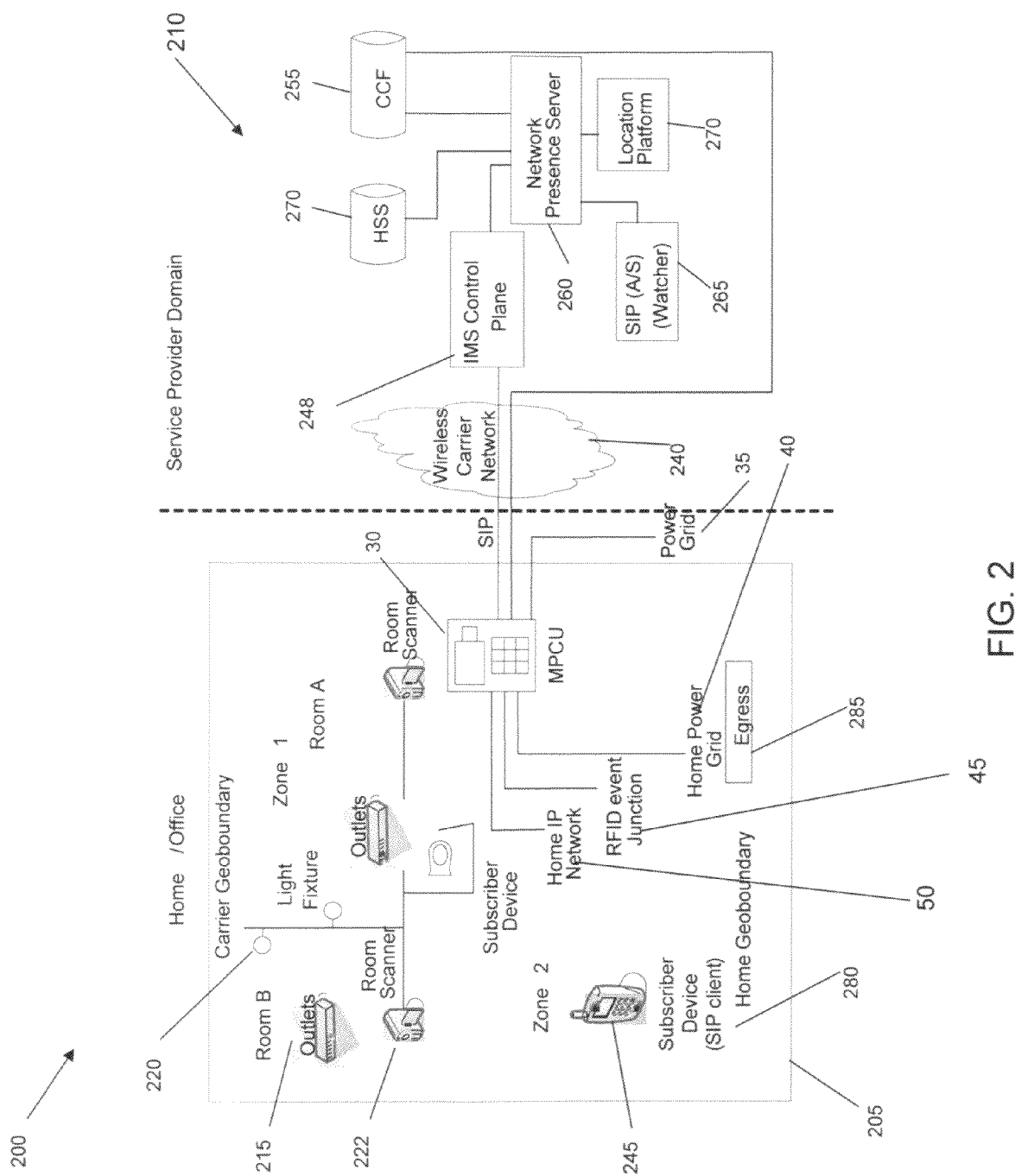
FIG. 2 shows an exemplary depiction of an overall architecture in accordance with aspects of the invention.

FIG. 2 shows an exemplary overall architecture 200 for implementing the present invention. As shown in FIG. 2, in embodiments, the MPCU 30 is located in the Home/Office 205 (on the left-hand side of FIG. 2) or other location using electrical appliances and/or devices (herein referred to as Home/Office. However, the invention contemplates that in further embodiments, the MPCU 30 may be located remotely (such as, for example, in the service provide domain 210 (on the right-hand side of FIG. 2) or in the electric utility domain (not shown)). As shown in FIG. 2, the MPCU 30 is connected to the external electrical power grid 35 and the home power grid 40. As should be understood by those of ordinary skill in the art, as the present invention may be implemented in a home, office, warehouse and/or retail space environment, depending on embodiments, the home power grid 40 may be an office/warehouse/retail space power grid.

Multiple zones (e.g., zone one and zone two) are depicted in this home and/or office environment 205, with zone one containing two rooms (e.g., room A and room B) with power outlets 215, light fixtures 220 and RFID room scanners 222. The home (or office) environment 205 includes an egress 285 (e.g., a door). Further, the home environment 205 has an established home geoboundary 280 (which is registered with the location platform 275 of the IMS). All of these electrical connections can be controlled by the MPCU 30. This allows the MPCU 30 to control, e.g., reduce electrical/energy consumption, electrical devices/appliances, e.g., light fixtures 220, outlets 215, in any zone (e.g., zone one, zone two) and/or room of a home/office. This control can be used to reduce energy consumption based on user location, presence, geoboundary events, RFID events and or WLAN events, as noted, by detecting a user device 205, etc.

Additionally, the MPCU 30 is registered as an SIP User Agent with the wireless carrier network 240 and is registered as an IP addressable client with the home network 50. Traditional IMS clients, such as, for example, a wireless device 245, are also depicted in the home 205 and are also registered as SIP endpoints that feed into the presence infrastructure of the wireless service provider.

As shown in FIG. 2, the right-hand side depicts components of the IMS network of the service provider domain 210. The MPCU 30 connects into the wireless carrier network 240 using standard SIP semantics as a SIP user agent with an IMS control plane 248 of the service provider domain 210. As should be understood by those skilled in the art, aspects of the service provider domain 210, e.g., the IMS control plane 248 and SIP communications are known to those skilled in the art. As such, a further description of these aspects are not deemed necessary for an understanding of the present invention. Other components of the IMS network include a network presence server 260, a location platform 275, other SIP application server watchers 265 (who may be, for example, interested in presence status changes across the wireless carrier network 240, a charging collector function (CCF) 255 and a home subscriber server (HSS) 270. The HSS 270 comprises a master user database that supports the IMS network entities. The HSS 270 contains the subscription-related information (e.g., user profiles), and is operable to perform authentication and authorization of the user, and can provide information about the user's physical location.

The network presence server 260 accepts, stores and distributes presence information. As described above, presence (e.g., presence state) constitutes the user's personal availability. The network presence server 260 may be implemented as a single server or have an internal structure involving multiple servers and proxies. There may be complex patterns of redirection and proxying while retaining logical connectivity to a single presence service.

The location platform 275 is also shown as being connected to the network presence server 260 primarily to depict that, in embodiments, location information may be incorporated into the presence document. However, as should be understood by those of ordinary skill in the art, incorporating location information into the presence document may not be necessary, as other mechanisms of exposing and consuming location information are readily available and supported.

FIG. 2 also depicts the capability of the MPCU 30 generating accounting records to an IMS charging collector function (CCF) 255. In embodiments, all the SIP network entities involved in the session send accounting information to the CCF 225 located in the service provider domain 210. The CCF 225 is operable to collect this information, and build a billing record, which is sent to a billing system (not shown).

Figure 3:
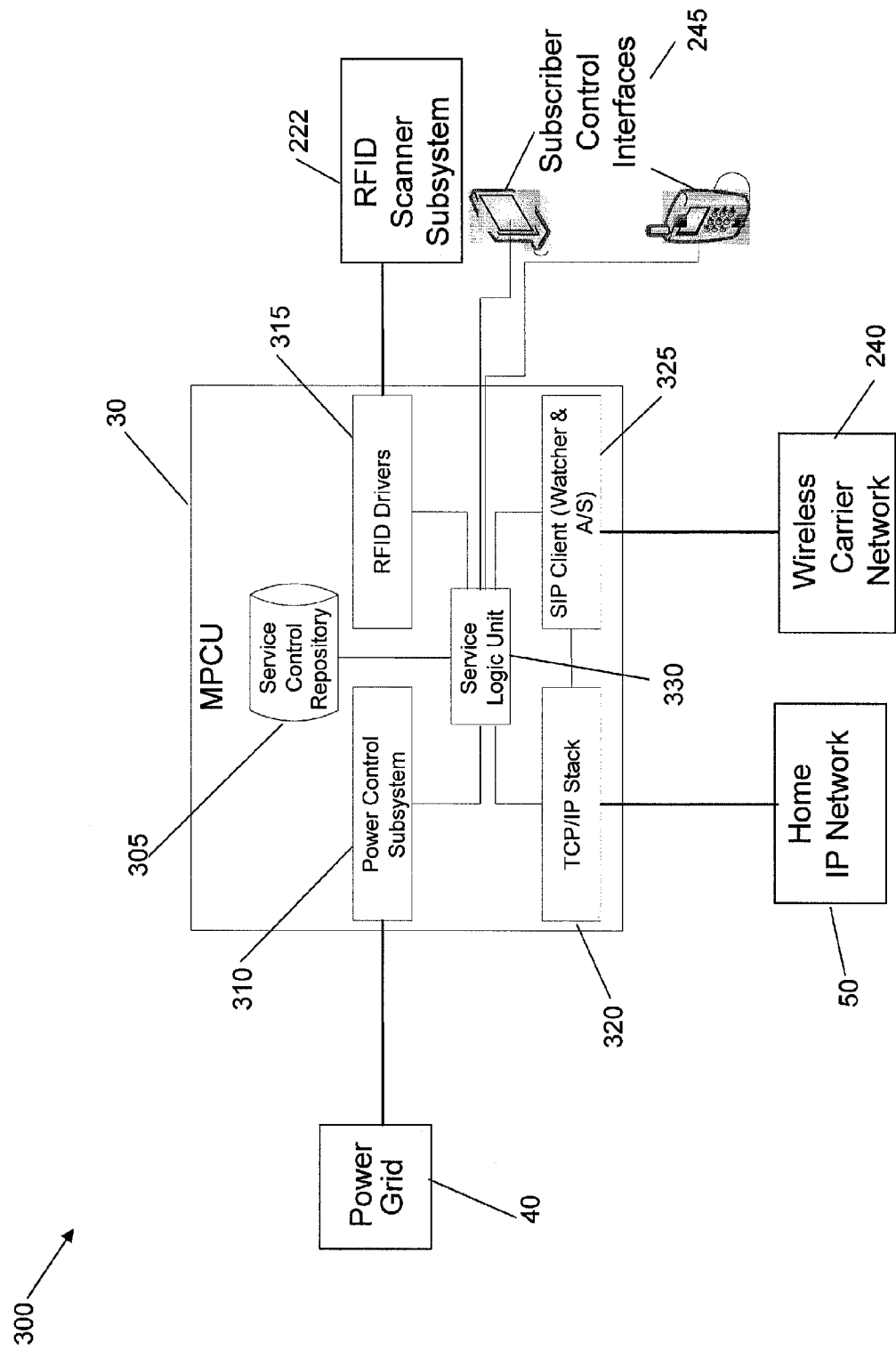
FIG. 3 shows an exemplary depiction of the components of a modular power control unit (MPCU) in accordance with aspects of the invention.

FIG. 3 shows an exemplary depiction 300 of the components of the MPCU 30. In embodiments, the MPCU 30 includes a service control repository 305, a power control subsystem 310, RFID drivers 315, a TCP/IP stack 320, an SIP client 325, and a service logic unit 330.

The service control repository 305 contains service configuration data. More specifically, in embodiments, the service control repository 305 may contain designations of a number of zones associated with the home/office, and the number of rooms associated with each zone. In embodiments, a zone may have at minimum one room, and typically has more than one room associated therewith. Additionally, the service control repository 305 may contain a listing of, e.g., devices, outlets, and appliances (referred to as consumers) associated with the zones and a listing of consumers associated with each room in each zone. Furthermore, the service control repository 305 may contain RFID tag identifications associated with, e.g., persons, wireless devices and chargers, and states associated with each consumer. In embodiments, the server configuration data may be provided by a user (e.g., a home owner or an office manager) and/or a service provider.

In addition to, or alternatively to, having purely binary states associated with each consumer (e.g., off or on), there can also be other settings, such as, for example, dim by twenty percent or increase by ten percent associated with specific consumers, which, in embodiments, may be implemented using, e.g., communications with the home (or other location) power grid 40 or X10 communications with specific X10-enabled consumers (e.g., devices) via the connection to the home power grid 40. Furthermore, the service control repository 305 may include configurable time periods after each event, before an action is invoked. For example, the service control repository 305 may include instructions to wait, e.g., five minutes after the subscriber leaves the house before turning off a heating, ventilation and air conditioning (HVAC) system.

Additionally, the service control repository 305 may contain rules associated with SIP notifications received from the wireless carrier network 240. For example, one rule could be a specific notification from the wireless carrier network 240 indicating that all subscribers have left the home/building 205, triggering a specific rule sequence that, for example, causes changes to HVAC consumers and causes multiple light bulb consumers to be turned off. In embodiments, the service control repository 305 may be stored in the storage system 22B of FIG. 1.

In accordance with further aspects of the invention, the power control subsystem 310 is the interface to the home (or office) power grid 40. Instructions for each consumer may be sent out by the service logic unit (SLU) 330 to the power control subsystem 310 when notifications from the RFID drivers 315 or the SIP interface are received and processed by the SLU 330, described further below.

Additionally, as shown in FIG. 3, the MPCU 30 includes RFID drivers 315. The RFID drivers 315 allow the MPCU 30 to process RFID events received from the RFID scanner subsystem comprising the RFID scanners 222 in the target enclosure (e.g., the home or office environment). Upon the occurrence of RFID events, the RFID drivers 315 send notifications of these events to the SLU 330 for processing.

In accordance with further aspects of the invention, the TCP/IP stack 320 allows the MPCU 30 to be a node in the home (or office) IP network 50. That is, via an existing gateway, the MPCU 30 uses the existing internet connection of the home IP network 50 to be an SIP client of the wireless carrier network 240, and also allows for configuration via an external client (e.g., a mobile device browser or a regular browser). Additionally, the TCP/IP stack 320 provides for PoE controls over devices, as described above, to manage power consumption.

Also, the MPCU 30 includes the SIP client 325, which may be a watcher and/or an application server. The SIP client 325 allows the MPCU 30 to utilize the existing TCP/IP stack 320 to be a special SIP UA of the wireless carrier network 240 for purposes of, e.g., receiving notifications from the wireless carrier network 240 (such as, for example, a geoboundary trigger) or, e.g., providing notifications to the wireless carrier network 240 when an RFID event occurs.

Additionally, as shown in FIG. 3, the MPCU 30 includes the service logic unit (SLU) 330. The SLU 330 comprises the processing engine of the MPCU 30. The SLU 330 receives indications of events from the RFID drivers 315 and the SIP client 325 and then uses the data in the service control repository 305 to determine how to react to these events. Typical actions may include, for example, changes sent to the home (or office) power grid 40 or notifications sent to the wireless carrier network 240 (e.g., the presence server 260) via the S-CSCF 250.

In embodiments, the MPCU 30 can be implemented as an embedded low cost Linux®-based client that has all the above elements pre-packaged into the MPCU 30. (Linux is a registered trademark of Linus Torvalds in the United States, other countries, or both.)

Flow Diagrams

Figure 4:
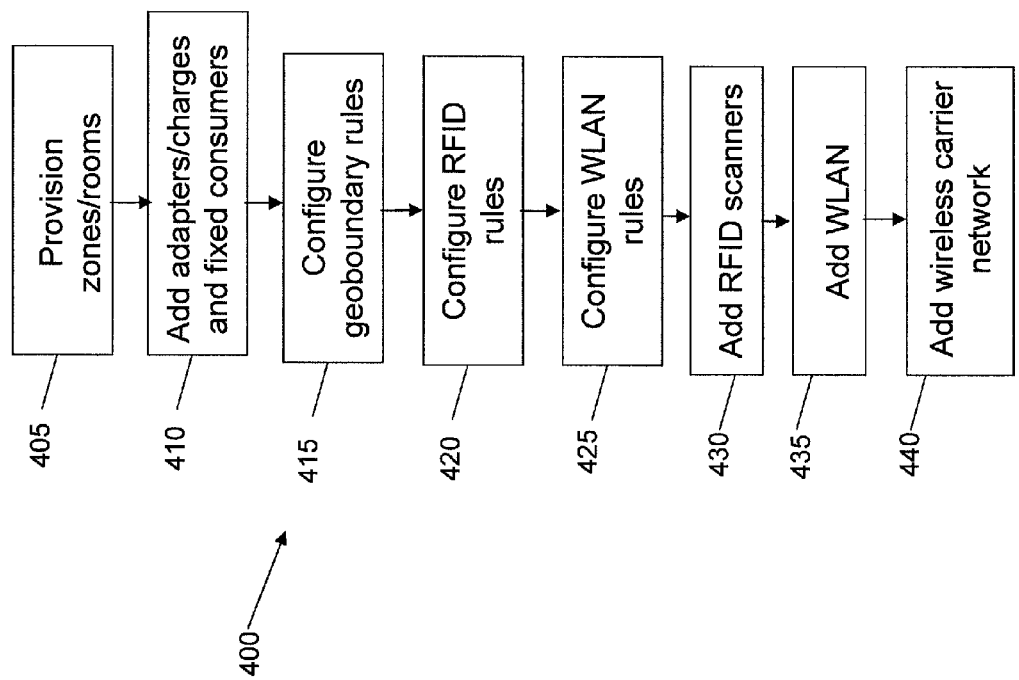
FIG. 4 shows an exemplary flow for a power management provisioning in accordance with aspects of the invention.
Figure 5:
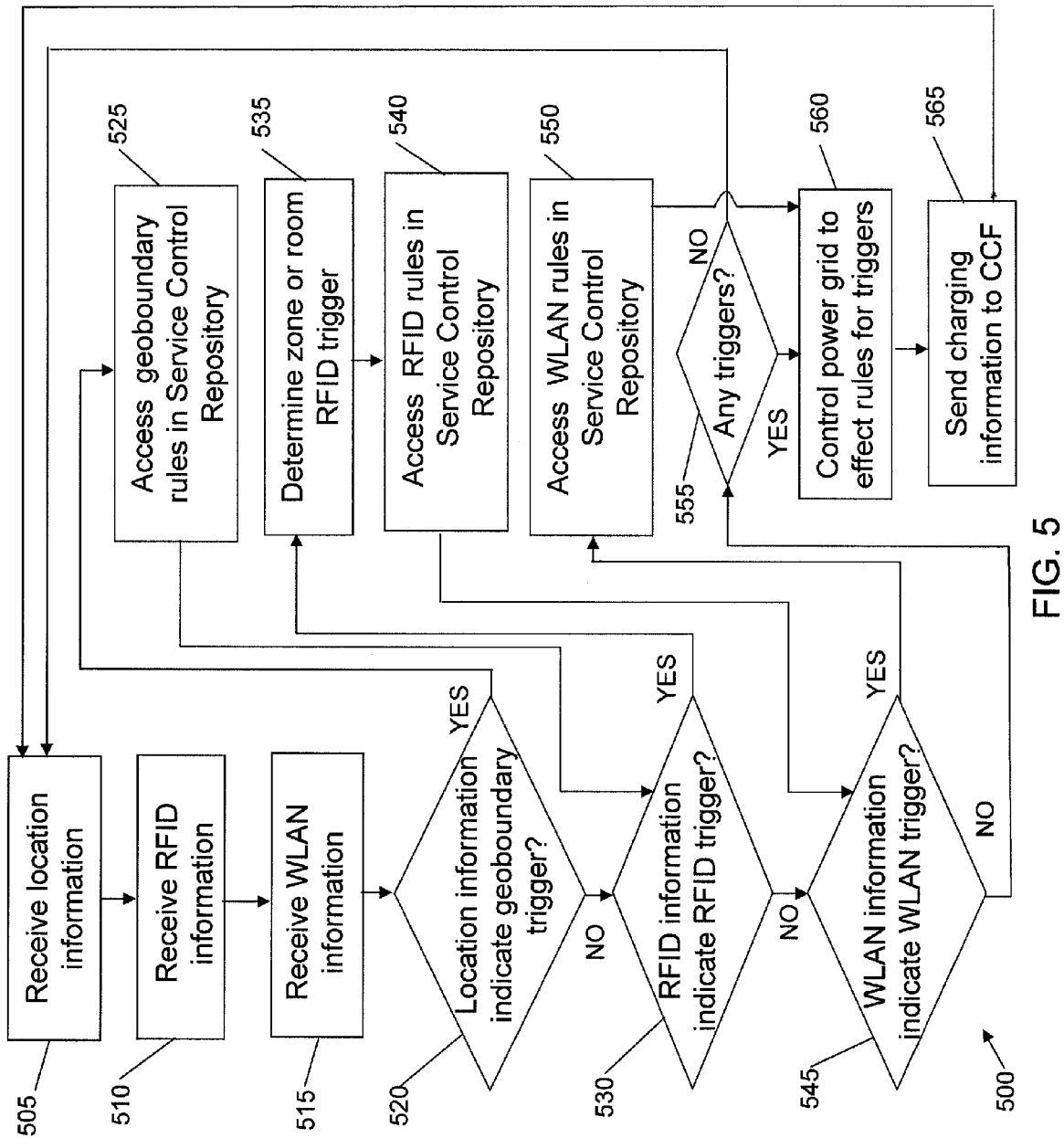
FIG. 5 shows an exemplary flow diagrams in accordance with aspects of the present invention.

FIGS. 4 and 5 show exemplary flows for performing aspects of the present invention. The steps of FIGS. 4 and 5 may be implemented in the environment of FIG. 1, for example. The flow diagrams may equally represent high-level block diagrams of the invention. The flowcharts and/or block diagram in FIGS. 4 and 5 illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the blocks may occur out of the order noted in the figure. For example, two blocks shown in succession may, in fact, be executed substantially concurrently, or the blocks may sometimes be executed in the reverse order, depending upon the functionality involved. Each block of each flowchart, and combinations of the flowchart illustrations can be implemented by special purpose hardware-based systems that perform the specified functions or acts, or combinations of special purpose hardware and computer instructions and/or software, as described above. Moreover, the steps of the flow diagrams may be implemented and executed from either a server, in a client server relationship, or they may run on a user workstation with operative information conveyed to the user workstation. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 4 depicts an exemplary flow 400 for a provisioning process of the MPCU 30 in accordance with aspects of the present invention. As shown in FIG. 4, at step 405, a user, e.g., a home owner, office manager, business owner, administrator and/or service provider, provisions the MPCU with, for example, the zone and room information associated with an enclosure/environment, e.g., a home, office, warehouse, retail space, etc. For example, the user may provision zone one of the enclosure as containing rooms one and two and may provision zone two as containing rooms three and four. At step 410, the user adds adapters, charges and/or fixed consumers to the MPCU. For example, the user identifies in the MPCU all the consumers (e.g., lights, outlets, chargers, adapters, etc.) and their association with a zone and/or the rooms associated with the zone.

At step 415, the user programs geoboundary rules instructing specific event/action sequences in the MPCU associated with each consumer upon an occurrence of a geoboundary event. At step 420, the user programs RFID rules instructing specific event/action sequences in the MPCU associated with each consumer upon an occurrence of an RFID event. At step 425, the user programs WLAN rules instructing specific event/action sequences in the MPCU associated with each consumer upon an occurrence of a WLAN event. More specifically, the specific event/action sequences may be implemented upon the occurrence of a geoboundary event, an RFID event and/or a WLAN event. Thus, the user may program specific event/action sequences in the MPCU associated with each consumer for one or more geoboundary events, one or more RFID events and one or more WLAN events. Moreover, as the environment may be used by multiple users (e.g., each of the residents of a house) the user may specific event/action sequences in the MPCU associated with each consumer specific to the different users. For example, a water heater in zone C (e.g., the garage) may have an instruction which instructs the MPCU to shut off the water heater when the MPCU 30 receives an SIP notification from the IMS control plane instructing the MPCU that all the subscribers have left the geoboundary and ten minutes have elapsed.

At step 430, the user associates the RFID scanners with each zone and/or room in the MPCU, such that specific event sequences can be associated with each zone and and/or room. At step 435, the user associates the WLAN with the MPCU, such that specific event sequences can be associated with WLAN triggers. At step 440, the user associates the wireless carrier network (or other service provider) with the MPCU, such that geoboundary triggers may be received by the MPCU.

FIG. 5 shows an exemplary flow 500 in accordance with aspects of the present invention. More specifically, the exemplary flow 500 depicts a power management operation of the MPCU 30 in response to a geoboundary trigger, an RFID trigger and/or a WLAN trigger.

At step 505, the MPCU receives location information from the wireless carrier network, if applicable. At step 510, the MPCU receives RFID information from the RFID scanners, if applicable. At step 515, the MPCU receives WLAN information from the WLAN, if applicable.

At step 520, the MPCU determines whether the location information indicates a geoboundary trigger. If, at step 520, the MPCU determines that the location information indicates a geoboundary trigger, at step 525, the MPCU accesses the geoboundary rules in the service control repository, and the process proceeds to step 530. If, at step 520, the MPCU determines that the location information does not indicate a geoboundary trigger, the process proceeds to step 530.

At step 530, the MPCU determines whether the RFID information indicates an RFID trigger. If, at step 530, the MPCU determines that the RFID information indicates an RFID trigger, at step 535, the MPCU determines whether the RFID trigger is a zone trigger or a room trigger. At step 540, the MPCU accesses the RFID rules in the service control repository, and the process proceeds to step 545. If, at step 530, the MPCU determines that the RFID information does not indicate an RFID trigger, the process proceeds to step 545.

At step 545, the MPCU determines whether the WLAN information indicates a WLAN trigger. In embodiments, the detection of the wireless event may be determined using media access control (MAC) addresses. In computer networking, a MAC address is a quasi-unique identifier assigned to most network adapters or network interface cards (NICs) by the manufacturer for identification. If, at step 545, the MPCU determines that the WLAN information indicates a WLAN trigger, at step 550, the MPCU accesses the WLAN rules in the service control repository, and the process proceeds to step 560. If, at step 545, the MPCU determines that the WLAN information does not indicate a WLAN trigger, the process proceeds to step 555.

At step 555, the MPCU determines whether there are any triggers, (e.g., a geoboundary trigger and/or an RFID trigger). If, at step 555, the MPCU determines that there is at least one trigger, the process proceeds to step 560. If, at step 555, the MPCU determines that there is not at least one trigger, the process proceeds to step 505.

At step 560, the MPCU controls the power grid to effect rules for the triggers. In embodiments, the MPCU may control the power grid by accessing the circuit breaker box to turn on/off particular circuits to, e.g., control power in a room and/or zone, and/or to turn on/off particular X10-enabled consumers (devices) via X10 communications. Additionally, in embodiments, the MPCU may control the power grid by PoE control of consumers (devices). At step 565, the MPCU sends accounting records (or charging information) of specific events, e.g., a power turn off operation to a charging collector function (CCF) of the IMS. This allows downstream mediation and billing actions to be driven, which allows for flexible business model support.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method comprising computer implemented steps of:
providing specific action sequences in a modular power control unit (MPCU) associated with each consumer and an indication of a geoboundary event;
providing specific action sequences in the MPCU associated with each consumer and a radio frequency identification (RFID) event, the specific action sequences for the indication of the geoboundary event being different from the specific action sequences for the occurrence of the RFID event;
receiving the indication of the geoboundary event;
determining the occurrence of the RFID event; and
adjusting one or more power consumption settings by controlling a power grid or an environment internet protocol (IP) network of an environment to effect the specific action sequences associated with each consumer and the indication of the geoboundary event based on the receiving of the indication of the geoboundary event and to effect the specific action sequences associated with each consumer and indication of the geoboundary event based on the determination of the occurrence of the RFID event.

2. The method of claim 1, wherein the receiving the indication of the geoboundary event occurs in response to a determination that a device in a wireless carrier network has traversed an established geoboundary.

3. The method of claim 1, wherein the indication of the geoboundary event is received via session initiation protocol (SIP).

4. The method of claim 1, wherein the computer implemented steps are performed in a computer infrastructure, and further comprising registering the computer infrastructure as a session initiation protocol (SIP) client of a wireless carrier network.

5. The method of claim 1, wherein the determining the occurrence of the RFID event comprises at least one of:
detecting an arrival of an RFID tag within at least one of a room and a zone of the environment;
detecting a departure of the RFID tag from the at least one of the room and the zone of the environment;
detecting a presence of two or more RFID tags within a predetermined range of one another; and
detecting an absence of the two or more RFID tags within the predetermined range of one another.

6. The method of claim 1, further comprising determining an occurrence of a local area network (LAN) event, wherein the determining the occurrence of the LAN event comprises detecting at least one of:
an arrival of a LAN-enabled device within a range of a LAN; and
a departure of the LAN-enabled device from the range of the LAN.

7. The method of claim 1, wherein the adjusting the one or more power consumption settings comprises controlling power distribution in the environment by at least one of:
accessing the power grid to adjust power supply in the environment;
accessing the power grid to effect power line wiring signaling and/or control; and
accessing the environment IP network to effect Power-over-Ethernet signaling and/or control.

8. The method of claim 1, wherein the environment comprises one or more zones and wherein the one or more zones each comprise one or more rooms.

9. The method of claim 1, wherein the environment is one of an office environment, a home environment, a warehouse environment and a retail environment.

10. The method of claim 1, further comprising provisioning at least one of:
one or more geoboundaries;
one or more RFID zones; and
one or more RFID rooms in each of the one or more RFID zones.

11. The method of claim 10, wherein the one or more geoboundaries comprises an environment geoboundary which is defined by a perimeter of the environment.

12. The method of claim 11, wherein the one or more geoboundaries comprise at least one of concentric geoboundaries and progressively larger geoboundaries surrounding the environment.

13. The method of claim 1, further comprising providing an RFID tag for at least one power consuming device.

14. The method of claim 13, further comprising establishing one or more power consumption rules for the at least one power consuming device, wherein the adjusting the one or more power consumption settings is performed in accordance with the one or more power consumption rules for the at least one power consuming device.

15. The method of claim 1, further comprising provisioning a wireless device as a SIP client of a wireless carrier network.

16. The method of claim 4, wherein a service provider at least one of creates, maintains, deploys and supports the computer infrastructure.

17. The method of claim 1, wherein the steps are provided by a service provider on a subscription, advertising, and/or fee basis.

18. A system, comprising:
a modular power control unit (MPCU) operable to:
receive an indication of a geoboundary event;
determine an occurrence of a radio frequency identification (RFID) event; and
adjust one or more power consumption settings by controlling a power grid or an environment internet protocol (IP) network of an environment based on the receiving of the indication of the geoboundary event and the determination of the occurrence of the RFID event,
wherein the MPCU comprises:
a power control subsystem operable to interface with the power grid of the environment;
a transmission control protocol/internet protocol (TCP/IP) stack operable to interface with the environment IP network;
one or more RFID drivers operable to interface with an RFID scanner subsystem;
a session initiation protocol (SIP) client watcher operable to interface with a wireless network;
a service control repository operable to store service configuration data; and
a service logic unit.

19. The system of claim 18, wherein the service configuration data comprises:
designations of one or more zones of the environment;
designations of one or more rooms for each of the one or more zones;
a listing of consumers associated with each of the one or more rooms;
one or more RFID tag identifications indicating an association to a consumer or a person; and
power control rules associated with each consumer or person for adjusting the one or more power consumption settings of the environment.

20. The system of claim 18, wherein the RFID scanner subsystem comprises at least one RFID scanner operable to determine the occurrence of the RFID event.

21. The system of claim 18, wherein the MPCU is registered as a session initiation protocol (SIP) client user agent.

22. The system of claim 18, wherein the indication of the geoboundary event is received via session initiation protocol (SIP).

23. A computer program product comprising a computer usable storage memory having readable program code embodied in the storage memory, the computer program product includes at least one component operable to:
receive an indication of a geoboundary event;
determine an occurrence of a radio frequency identification (RFID) event;
determine the geoboundary event is a trigger for a first event or series of actions associated with a consumer, the first event or series of actions including control of a power grid or an environment interne protocol (IP) network of an environment;
determine the RFID event is an RFID trigger for second event or series of actions associated with the consumer or another consumer, the second event or series of actions including control of the power grid or the environment IP network of the environment, the first event or series of actions being different from the second event or series of actions; and
adjust one or more power consumption settings by controlling the power grid or the environment IP network of the environment to effect the first event or series of actions based on the determining the geoboundary event is a geoboundary trigger and to effect the second event or series of actions based on the determining the RFID event is an RFID trigger,
wherein the computer program product is registered as a session initiation protocol (SIP) client user agent, and
wherein the indication of the geoboundary event is received via SIP.

24. A method comprising computer implemented steps of:
receiving an indication of a geoboundary event via session initiation protocol (SIP), which occurs in response to a determination that a wireless device in a wireless carrier network has traversed an established geoboundary;
detecting an occurrence of a radio frequency identification (RFID) event;
detecting an occurrence of a local area network (LAN) event;
determining whether the geoboundary event is a geoboundary trigger for a first event or series of actions including control of a power grid or an environment internet protocol (IP) network of an environment;
determining whether the RFID event is an RFID trigger for a second event or series of actions including the control of the power grid or the environment IP network of the environment;
determining whether the LAN event is a LAN trigger for a third event or series of actions including the control of the power grid or the environment IP network of the environment;
receiving one or more power consumption rules for at least one power consuming device in the environment, wherein the one or more power consumption rules instruct the first event or series of actions, the second event or series of actions, and the third event or series of actions to be taken when the geoboundary trigger, the RFID trigger, or the LAN trigger are respectively determined; and
adjusting one or more power consumption settings of an environment based on whether the geoboundary event is the geoboundary trigger, the RFID event is the RFID trigger, or the LAN event is the LAN trigger, which is performed in accordance with the one or more power consumption rules for the at least one power consuming device and comprises using a processor to control power distribution to the at least one power consuming device in the environment by at least one of:
- accessing an environment power grid to adjust power supply in the environment;
- accessing the environment power grid to effect power line wiring signaling and/or control; and
- accessing an environment internet protocol (IP) network to effect Power-over-Ethernet signaling and/or control.

25. The method of claim 24, further comprising:
- providing the at least one power consuming device with an RFID tag;
- providing a personal item of a user or a mobile device of the user with an RFID tag; and
- providing the environment with an RFID scanner configured to scan for the at least one power consuming device with the RFID tag and the personal item of the user or the mobile device of the user with the RFID tag, wherein the detecting the occurrence of the RFID event comprises at least one of:
- detecting an arrival of the personal item of the user or the mobile device of the user with the RFID tag within at least one of a room or a zone of the environment; and
- detecting a departure of the personal item of the user or the mobile device of the user with the RFID tag from the at least one of the room or the zone of the environment.

26. The method of claim 25, wherein:
- detecting a presence of the at least one power consuming device with the RFID tag within a predetermined range of the personal item of the user or the mobile device of the user with the RFID tag; and
- detecting an absence of the at least one power consuming device with the RFID tag within the predetermined range of the personal item of the user or the mobile device of the user with the RFID tag.

* * * * *